(12) United States Patent
Chin et al.

(10) Patent No.: US 9,865,296 B1
(45) Date of Patent: Jan. 9, 2018

(54) HEAT-ASSISTED MAGNETIC RECORDING DEVICE CAPABLE OF LASER CALIBRATION DURING A BACKGROUND OPERATION

(71) Applicant: Seagate Technology LLC, Cupertino, CA (US)

(72) Inventors: Tze Pin Chin, Singapore (SG); Tanghe Guo, Singapore (SG); Feng Shen, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/263,679

(22) Filed: Sep. 13, 2016

(51) Int. Cl.
G11B 11/00 (2006.01)
G11B 7/1267 (2012.01)
G11B 5/55 (2006.01)
G11B 7/1263 (2012.01)
G11B 20/18 (2006.01)
G11B 5/00 (2006.01)
G11B 7/126 (2012.01)

(52) U.S. Cl.
CPC .......... G11B 7/1267 (2013.01); G11B 5/5521 (2013.01); G11B 7/1263 (2013.01); G11B 20/1816 (2013.01); G11B 7/126 (2013.01); G11B 2005/0021 (2013.01)

(58) Field of Classification Search
None
See application file for complete search history.

(56) References Cited

U.S. PATENT DOCUMENTS

| | | | | |
|---|---|---|---|---|
| 5,513,166 A | * | 4/1996 | Tokumitsu | G11B 7/0045 369/53.15 |
| 5,859,738 A | * | 1/1999 | Forehand | G11B 5/40 360/75 |
| 6,549,376 B1 | * | 4/2003 | Scura | G11B 5/4826 360/245.1 |
| 9,075,714 B1 | * | 7/2015 | Tsai | G11B 20/1889 |
| 9,117,479 B1 | | 8/2015 | Madison et al. | |
| 9,153,272 B1 | | 10/2015 | Rausch et al. | |
| 9,269,393 B1 | * | 2/2016 | Webb | G11B 27/36 |
| 9,311,951 B1 | | 4/2016 | Chu et al. | |
| 9,361,920 B1 | * | 6/2016 | Zhu | G11B 5/5565 |
| 9,401,165 B1 | * | 7/2016 | Tian | G11B 5/54 |
| 9,472,219 B1 | * | 10/2016 | Raghunathan ... | G11B 20/10388 |
| 2009/0296257 A1 | * | 12/2009 | Nakano | G11B 5/09 360/71 |
| 2010/0083295 A1 | * | 4/2010 | Eto | G11B 7/00736 720/695 |
| 2016/0265908 A1 | * | 9/2016 | Ruthe | G01B 15/02 |

FOREIGN PATENT DOCUMENTS

JP 2009020947 A * 1/2009 ............. G11B 5/02

* cited by examiner

Primary Examiner — Tan X Dinh
(74) Attorney, Agent, or Firm — Hollingsworth Davis, LLC

(57) ABSTRACT

A storage device performs a background operation involving seeking a read/write head between inner and outer diameters of a disk of the storage device. During the seeking, adjacent test tracks are written at a diameter between the inner and outer diameters of the disk. The adjacent test tracks are written using varying levels of laser power applied to the disk via the read/write head. An optimum value of the laser power is determined based on reading at least one of the adjacent test tracks.

21 Claims, 5 Drawing Sheets

HEAT-ASSISTED MAGNETIC RECORDING DEVICE CAPABLE OF LASER CALIBRATION DURING A BACKGROUND OPERATION

SUMMARY

The present disclosure is directed to a laser calibration performed during a background operation of a data storage device. In one embodiment, a storage device begins a background operation involving seeking a read/write head between inner and outer diameters of a disk of the storage device. The disk includes a heat-assisted magnetic recording medium, and the background operation occurs repeatedly during field operation of the storage device and performed to reduce wear of the read/write head. During the seeking, adjacent test tracks are written at a diameter between the inner and outer diameters of the disk. The adjacent test tracks are written using varying levels of laser power applied to the disk via the read/write head. An optimum value of the laser power is determined based on reading at least one of the adjacent test tracks.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
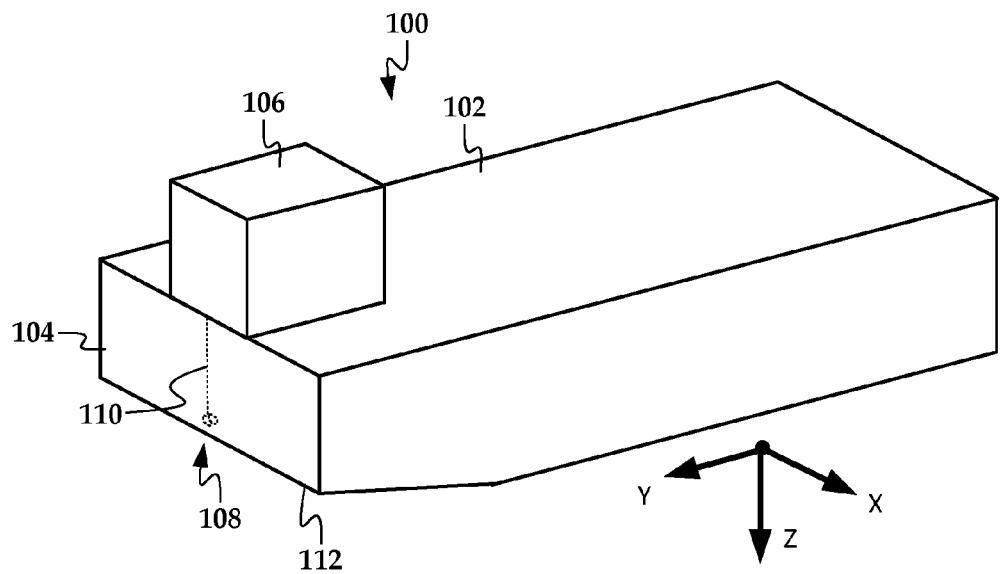
FIG. 1 is a perspective view of a slider assembly according to an example embodiment.

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The energy from the laser is coupled into an optical waveguide path and directed to a near-field transducer that shapes and directs the energy to heat the recoding medium. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

Because the magnetic field applied during recording is typically much larger than the hotspot, the size of the hotspot defines the size of the recorded bits of data. If there are changes to the hotspot size, then performance may suffer. For example, if the hotspot is too large, then adjacent track data may be overwritten. If the hotspot is too small, the resulting small bits may be difficult to read back.

While a number of causes can affect the hotspot size (e.g., changes in the laser, changes in the delivery path), the system controller may have only a few active components that can be adjusted to maintain hotspot size. One of these active components is the laser diode itself, the output of which can be changed by changing an activation current. Another active component that can be changed to affect hotspot size is a clearance control actuator that controls a clearance between the read/write head and the media surface. For example, a resistive heater may be used to induce local thermal protrusion near the read and write transducers, and this protrusion can be controlled by selective application of current to the heater. The head-to-media clearance affects more than hotspot size, so the laser current and heater current may be adjusted together to maintain a desired hotspot size while keeping clearance within a desired range.

In order to maintain consistent HAMR recording performance, a storage device may utilize a Fine Laser Calibration (FLC) during operation of the device. This calibration aims to compensate for changes in the optical delivery path by periodically performing an algorithm through which the system controller attempts to find optimized laser current values. For example, an optimum laser value may correspond to the lowest bit error rate (BER) for all the heads and zones in a drive.

Generally, the FLC is time consuming, and is run in the background so as not to affect apparent performance of the device. However, during times of high utilization, the drive may not be able to enough significant background time to run the FLC when needed. Idle time can be tight under such circumstances. Further, other dedicated background tasks may also need to run at repeated intervals, and the FLC may delay or hinder these other background tasks.

In embodiments described below, FLC is incorporated into dithering. Dithering is a background operation that is used to reduce wear and tear of the read/write heads and recording media. The operation involves a series of seeks that position the heads over the surface of the media to reduce localized head and media wear. Dithering may also involve periodically switching head selects in order to rotate the heads being used to retrieve servo position information.

The procedures described herein can be used to calibrate HAMR read/write heads. In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

Figure 2:
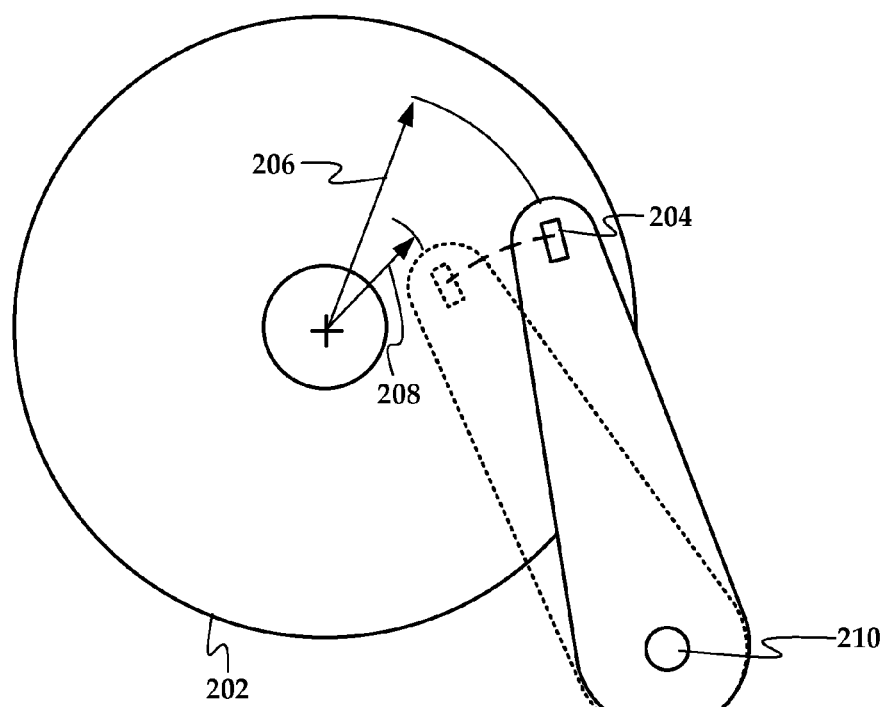
FIG. 2 is a top view of a disk and arm according to an example embodiment.

In FIG. 2, a top view shows an arm 200 positioned over a magnetic disk 202 according to an example embodiment. A read/write head 204 is positioned at an end of the arm 200 and is moved to different radial locations 206, 208 by rotating the arm 200 about an axis 210. Radial location 206 generally corresponds to an OD of the disk 202, and radial location 208 generally corresponds to an ID of the disk 202. A dithering operation involves traversing the read/write head 204 between these locations 206, 208, as indicated by the dashed lines. Generally, the OD 206 may be an outermost track within a user data region and the ID may be an innermost track. The tracks at the ID 208 have the lowest KFCI (kilo flux change per inch) which results in the lowest data rates on the disk 202 while tracks at the OD 206 have the highest KFCI and therefore support the highest data rate.

Dithering occurs repeatedly (e.g., every five minutes) when a head is loaded. During this time, the head seeks from an outer diameter (OD) to an inner diameter (ID). The dither requirement is satisfied when the seek distance is greater or equal to 80% of the stroke length 206 to 208 within user area. Generally, the dithering operation has a number of goals. The heads are set to the maximum fly height by turning the clearance heaters off to reduce power consumption, Turning the heaters off causes the head to fly at maximum height, which will help prevent bumping the head into the disk due to thermal asperity during the seek. The heads are moved in a manner to clear debris, which may have accumulated on the heads. By slowly moving the slider over the fast moving disk, the air flow generated will help to clear the debris on the head. After the dithering operation, the heads are positioned to reduce average access time and reduce power consumption subsequent to the dither operation. For example, the heads may be located somewhere in the middle between the ID and OD.

Figure 3:
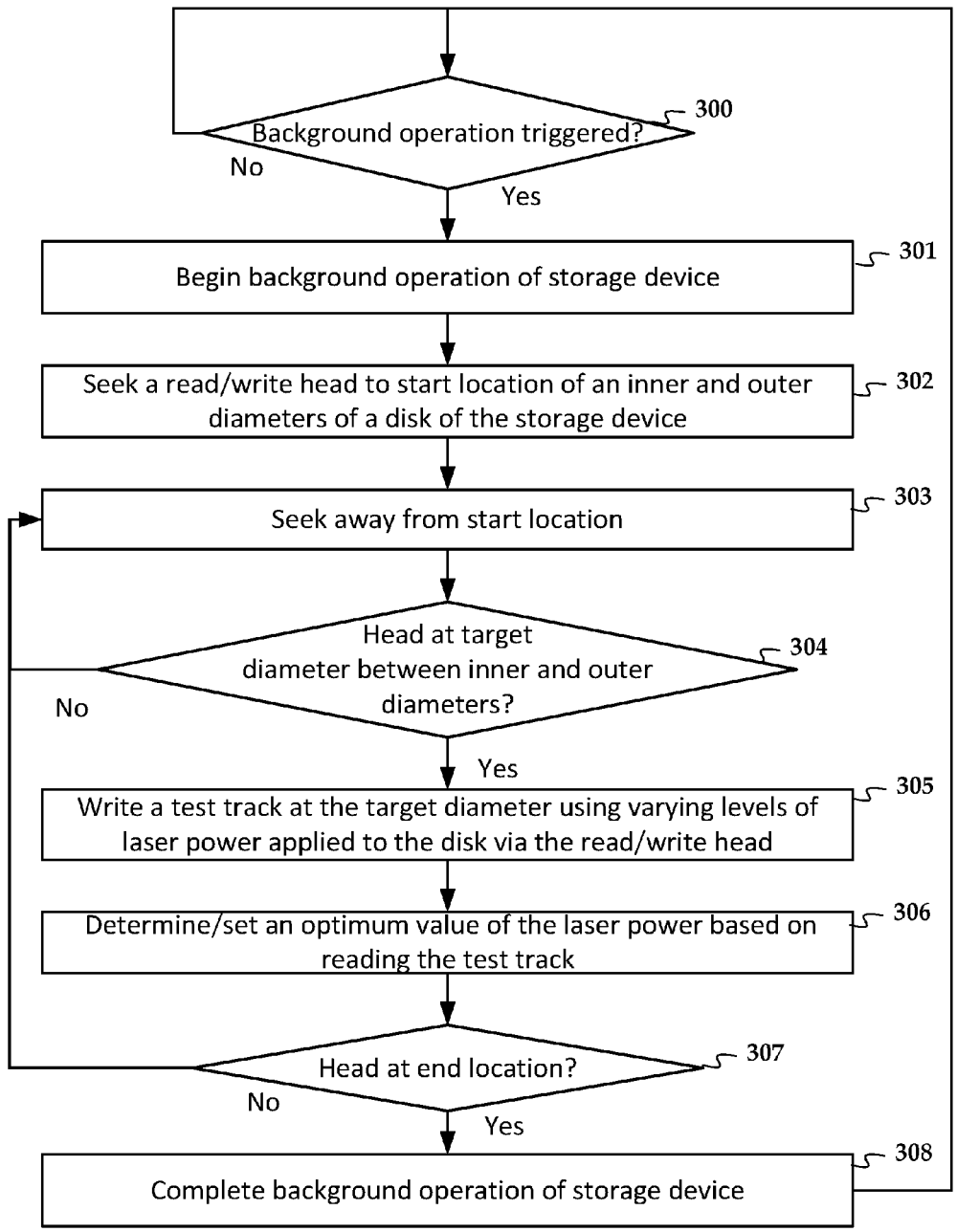
FIG. 3 is a flowchart of a method according to an example embodiment.

In FIG. 3, a flowchart shows a hard disk procedure according to an example embodiment. The procedure involves detecting 300 a trigger for a background operation. The trigger may be based on time, which includes system clock running time, time spent writing/reading, etc. The trigger may also be based on some other system indicator, such as read/write errors, environmental parameters (e.g., shock, vibration, temperature) exceeding a threshold, drive initialization/reconfiguration (e.g., formatting of a partition, RAID rebuild), explicit user request via operating system, etc.

The background operation begins at 301, and this may involve certain record keeping or state management. For example, host access may be paused after the beginning 301 of the background operation, a watchdog timer may be initiated to interrupt the background operation if it takes too long, etc. The background operation may also be interrupted in response to other events, e.g., a priority host request. One of the first steps taken during the background operation is to seek 302 the read/write head(s) to an inner or outer diameter of a disk. Thereafter, the read/write heads seek 303 away from the start location to the opposite side of the disk, e.g., from inner to outer diameter or from outer to inner diameter.

If it is determined 304 that the head is at or near some target diameter, adjacent test tracks are written 305 using varying levels of laser power applied to the disk via the read/write head. As will be described in greater detail below, the adjacent tracks may include a main track and two or more tracks on either side of the main track. The adjacent tracks may be written at a squeezed or unsqueezed pitch, meaning track spacing is respectively less than nominal or greater than/equal to nominal when writing the adjacent tracks. At least one of the test tracks (e.g., the main track) is then read to determine 306 an optimum laser power. This operation 306 may also involve setting/saving the optimum power for future use if the optimum laser power is different than the currently used power level. After the laser calibration, the background process continues, testing 307 for the end location (e.g., inner or outer diameter, depending on which start location was used). At the end location, the background operation completes 308, which may involves setting modes and variables that were changed at block 301.

Performing the laser calibration during the background operation as shown in FIG. 3 will save time in performing the laser calibration because the background operation will pass by the calibration zone and so no separate seeks to the calibration zone are required. A resource mediator (e.g., process that manages allocation of computational resources between background and host-directed operations) will create an additional data structure to keep track of the laser calibration activity. Such data structure may include particular data used by the calibration such that an interrupted calibration can be resumed without have to re-run previously operated steps. For example, if the adjacent test tracks were written but the calibration was interrupted before the test tracks could be read, during the next opportunity to run the calibration, the adjacent tracks need not be rewritten, assuming the adjacent test tracks were previously and fully written within a certain time period.

Figure 4:
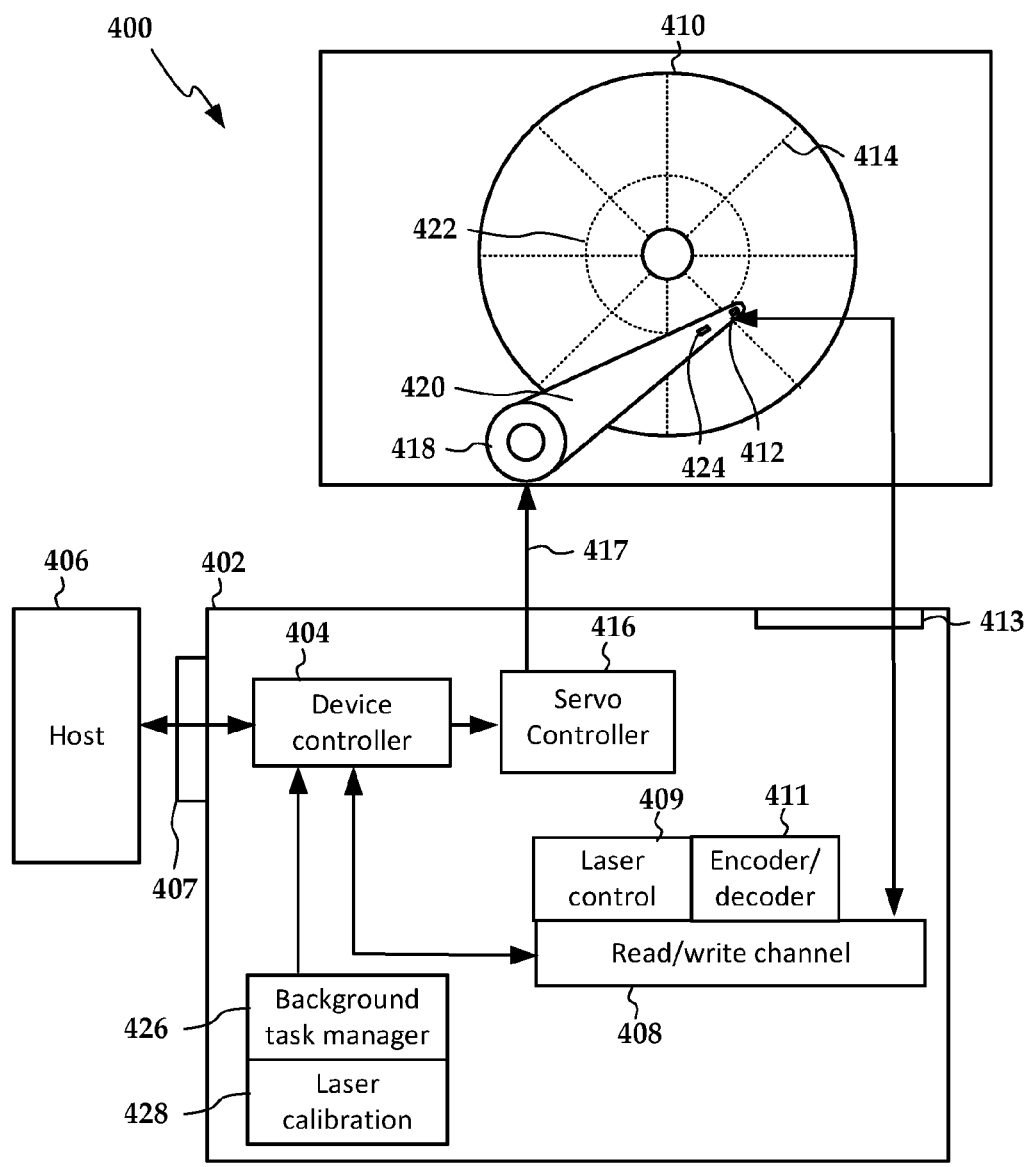
FIG. 4 is a block diagram of an apparatus according to an example embodiment.

In FIG. 4, a diagram illustrates components of a data storage device 400 (e.g., hard disk drive apparatus) according to an example embodiment. The apparatus includes circuitry 402 such as a system controller 404 that processes read and write commands and associated data from a host device 406. The host device 406 may include any electronic device that can be communicatively coupled to store and retrieve data from a data storage device, e.g., a computer. The system controller 404 is coupled to a read/write channel 408 that reads from and writes to surfaces of one or more magnetic disks 410.

The read/write channel 408 may include analog and digital circuitry such as decoders, timing-correction units, error correction units, etc. The read/write channel is coupled to the heads via interface circuitry 413 that may include preamplifiers, filters, digital-to-analog converters, analog-to-digital converters, etc. The read/write channel 408 generally converts data between the digital signals processed by the system controller 404 and the analog signals conducted through two or more read/write heads 412 during read operations. At least one of the read/write heads 412 includes a laser used to heat a spot on the magnetic disk 410 during recording of data. A laser control module 409 controls various aspects of the laser operation during both reading and writing. The laser module 409 may dictate when the laser is switch on and off, set laser current based on various conditions, monitor laser power, e.g., via a photo-sensor on the read/write head 412. Generally, the read/write channel 408 provides facilities for communicating this and other control/sensor data with the read/write heads 412.

In addition to processing user data, the read/write channel 408 reads servo data from servo wedges 414 on the magnetic disk 410 via the read/write head. All of the multiple readers of the read/write head may be used to read servo data, or only a subset thereof. The servo data are sent to a servo controller 416, which uses the data to provide position control signals 417 to a VCM 418. The VCM 418 rotates an arm 420 upon which the read/write heads 412 are mounted in response to the control signals 417. The position control signals 417 may also be sent to microactuators 424 that individually control each of the read/write heads 412, e.g., causing small displacements at each head.

A background task manager 426 repeatedly performs regular background tasks such as dithering during the life of the apparatus 400. Such background tasks are for purposes of maintenance and/or detection of conditions that may lead to device failures in the future. During at least one of the background tasks, e.g., the dithering operation, a laser calibration module 428 performs a calibration that includes writing to adjacent test tracks between inner and outer diameters of the disk 410. Because the background task involves seeking from an inner to an outer diameter (or vice versa) the laser calibration can be performed without additional seeking of the read/write heads 412.

Figure 5:
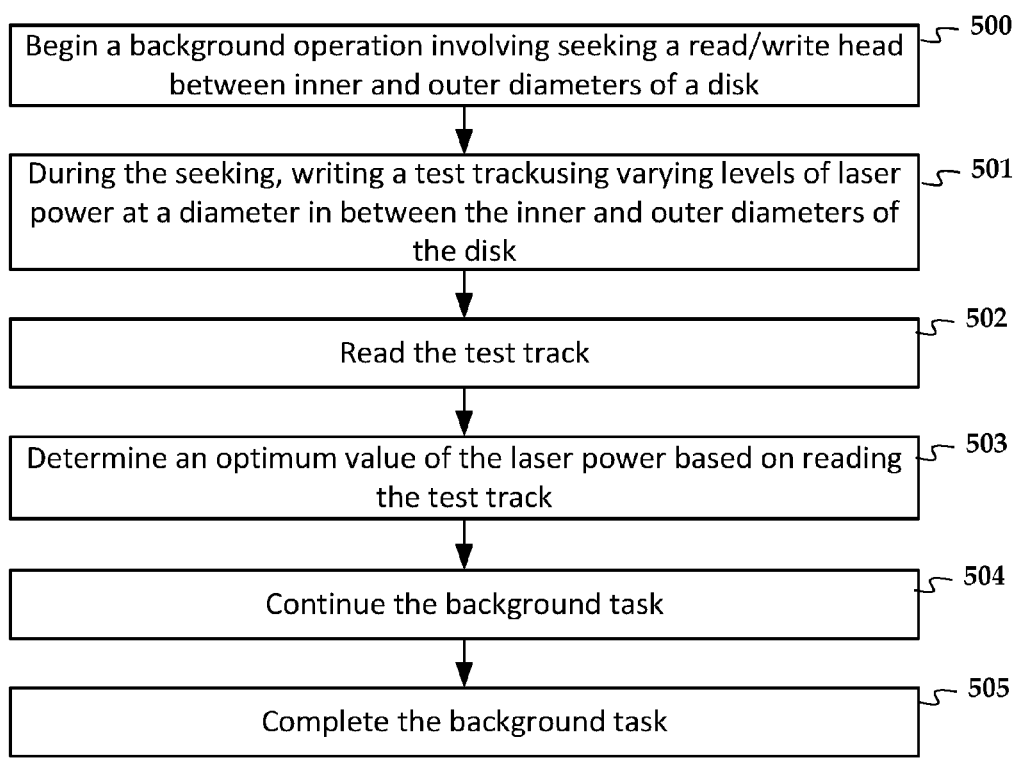
FIGS. 5 and 6 are flowcharts of methods according to example embodiments.

In FIG. 5, a flowchart shows a method according to an example embodiment. The method involves causing an apparatus (e.g., data storage device) to begin 500 a background operation involving seeking a read/write head between inner and outer diameters of a disk of the storage device. The disk includes a heat-assisted recording medium, and the background operation occurs repeatedly during field operation of the storage device and is performed to reduce wear of the read/write head. During the seeking, adjacent test tracks (e.g., a main track and adjacent tracks on either side) are written 501 at a diameter in between the inner and outer diameters of the disk. The adjacent test tracks are written 501 using varying levels of laser power applied to the disk via the read/write head An optimum value of the laser power is determined 503 based on reading at least one of the test tracks. This optimum laser power can be used as a new operational power level thereafter. After determining 503 the optimum laser power, the background operation continues 504, performing other actions needed. Because of the head is only sweeping from OD to ID or ID to OD during dithering, the head can stop at the test track to do FLC without a seek time penalty. After completing the process, the head can continue to sweep through the same direction as before until all the test zones had been processed and it reaches the destination (either OD or ID). Finally, the background operation completes 503, allowing the storage device to responds to host commands, perform additional background tasks, etc.

Figure 6:
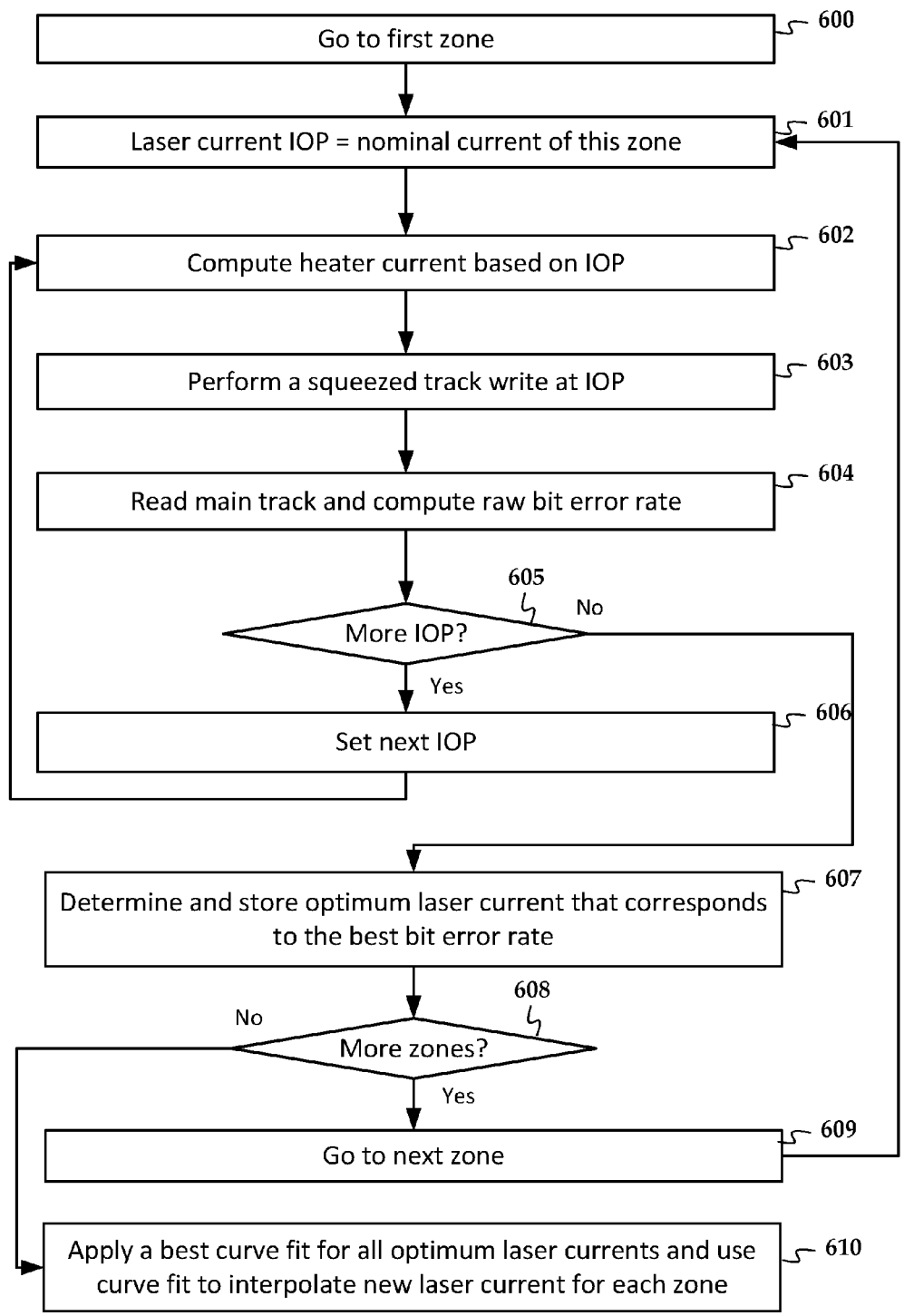

As noted above, the fine laser calibration involves writing a series of adjacent tracks and then reading back at least one of the track, e.g., a main track. In FIG. 6, a flowchart shows details of a fine laser calibration according to an example embodiment. The procedure generally iterates through two loops: an outer loop that iterates through a plurality of radially-defined zones of the disk and an inner loop that iterates through different laser current values (IOP). It will be understood that some of the details of this procedure may be changed to suit the time and location constraints involved in performing the calibration during a dithering process. For example, only a subset of zones may be tested, and the results extrapolated to other zones.

The procedure begins by moving 600 the read/write head to a first zone, and then setting 601 IOP to the nominal (e.g., previously defined optimum) value for this zone. To maintain constant fly height during this process, heater values are recomputed 602 and applied to preamp before each iteration based on the value of IOP. A squeezed track write is then performed 603, which involves a normal write on a main track plus squeezed write at reduced pitch on adjacent tracks either side of the main track. The servo control system allows setting a track pitch at less than nominal for the squeezed track writes. A read 604 is performed on the main track and raw bit error rate computed for this level of TOP.

As indicated by loop limits 605 and 606, the previous steps are repeated for a range of IOP values. After all IOP values have been tested, an optimum laser current that corresponds to the best bit error rate (e.g., a minimum bit error rate) is determined and stored 607. As indicated by loop limits 608, 609, the previous finding of optimum TOP is repeated for all of the test zones. Once optimum TOP for all test zones has been found and stored, a curve fit (e.g., quadratic curve) that best fits the optimum TOP as a function of zone is applied and use to interpolate 610 a new optimum TOP is interpolated for all the zones in the drive.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    causing a storage device to begin a background operation involving seeking a read/write head between inner and outer diameters of a disk of the storage device, the disk comprising a heat-assisted magnetic recording medium, the background operation occurring repeatedly during field operation of the storage device and performed to reduce wear of the read/write head;
    during the seeking, writing adjacent test tracks at a calibration zone between the inner and outer diameters of the disk such that no separate seeks to the calibration zone are required, the adjacent test tracks written using varying levels of laser power applied to the disk via the read/write head; and
    determining an optimum value of the laser power based on reading at least one of the adjacent test tracks via the read/write head.

2. The method of claim 1, wherein the background operation involves clearing debris from the read/write head.

3. The method of claim 1, wherein the background operation involves repositioning a slider over the disk to reduce wear of the disk.

4. The method of claim 1, wherein determining the optimum value of the laser power comprises reading a bit error rate of the test track, the optimum value of the laser power corresponding to a minimum value of the bit error rate.

5. The method of claim 1, further comprising, after determining the optimum value of the laser power, setting the optimum value of the laser power as an operational laser power of the storage device for subsequent recording operations.

6. The method of claim 1, further comprising, after determining the optimum value of the laser power, resuming additional tasks involved with the background operation.

7. The method of claim 1, wherein the background operation comprises a dithering operation.

8. The method of claim 1, wherein the inner diameter corresponds to an innermost track of the disk and wherein the outer diameter corresponds to an outermost track of the disk.

9. A data storage device, comprising:
    interface circuitry configured to communicate with a read/write head comprising a laser, the laser configured to heat a magnetic recording medium during recording; and
    a controller coupled to the interface circuitry, the controller configured to:

begin a background operation involving seeking the read/write head between inner and outer diameters of the magnetic recording medium, the background operation occurring repeatedly during field operation of the data storage device and performed to reduce wear of the read/write head;

during the seeking, write adjacent test tracks at a calibration zone between the inner and outer diameters of the disk such that no separate seeks to the calibration zone are required, the adjacent test tracks written using varying levels of laser power applied to the disk via the read/write head; and determine an optimum value of the laser power based on reading at least one of the adjacent test tracks via the read/write head.

10. The data storage device of claim 9, wherein the background operation involves clearing debris from the read/write head.

11. The data storage device of claim 9, wherein the background operation involves repositioning a slider over the disk to reduce wear of the disk.

12. The data storage device of claim 9, wherein determining the optimum value of the laser power comprises reading a bit error rate of the test track, the optimum value of the laser power corresponding to a minimum value of the bit error rate.

13. The data storage device of claim 9, wherein the controller is further configured to, after determining the optimum value of the laser power, set the optimum value of the laser power as an operational laser power of the storage device for subsequent recording operations.

14. The data storage device of claim 9, wherein the controller is further configured to, after determining the optimum value of the laser power, resume additional tasks involved with the background operation.

15. The data storage device of claim 9, wherein the background operation comprises a dithering operation.

16. The data storage device of claim 9, wherein the inner diameter corresponds to an innermost track of the disk and wherein the outer diameter corresponds to an outermost track of the disk.

17. A method comprising:
detecting a trigger for a background operation performed by a hard disk drive apparatus;
beginning the background operation in response to the trigger to reduce wear of a read/write head of he hard disk drive apparatus, the background operation involving seeking the read/write head from a start location to an ending location, the start location comprising one of an inner or outer diameter of a heat-assisted magnetic recording medium;

in response to determining that the read/write head is proximate a target diameter during the seeking such that no separate seeks are required to reach the target diameter:

writing adjacent test tracks using varying levels of laser power applied to laser of the read/write head, the adjacent tracks comprising a main track and tracks on either side of the main track written at a squeezed track pitch; and reading the main track to determine an optimum laser power and set the optimum laser power as an operational laser power for subsequent recording operations; and seeking to the ending location away from the start location, and completing the background operation in response thereto.

18. The method of claim 17, wherein the background operation involves clearing debris from the read/write head.

19. The method of claim 17, wherein the background operation comprises a dithering operation.

20. The method of claim 17, wherein determining the optimum value of the laser power comprises reading a bit error rate of the main track, the optimum value of the laser power corresponding to a minimum value of the bit error rate.

21. The method of claim 1, wherein the writing of the adjacent test tracks and the reading of the at least one of the adjacent test tracks comprise a laser calibration, the method further comprising:

responsive to an interruption during the laser calibration, creating a data structure to keep track of laser calibration; and using the data structure to resume the laser calibration upon the next opportunity after the interruption.

* * * * *